United States Patent
Munson, Jr.

(10) Patent No.: US 6,895,325 B1
(45) Date of Patent: May 17, 2005

(54) OVERSPEED CONTROL SYSTEM FOR GAS TURBINE ELECTRIC POWERPLANT

(75) Inventor: Bill C. Munson, Jr., Porthill, ID (US)

(73) Assignee: Altek Power Corporation, Kelowna (CA)

(*) Notice: Subject to any disclaimer, the term of this patent is extended or adjusted under 35 U.S.C. 154(b) by 52 days.

(21) Appl. No.: 10/123,489

(22) Filed: Apr. 16, 2002

(51) Int. Cl.$^7$ ............................................. G06F 11/00
(52) U.S. Cl. ..................... 701/100; 701/99; 701/101; 701/1; 340/439; 73/118.2; 60/772; 60/773; 60/782
(58) Field of Search .................. 701/100, 60

(56) References Cited

U.S. PATENT DOCUMENTS

| | | | |
|---|---|---|---|
| 4,259,835 A | 4/1981 | Reed et al. | 60/39.28 R |
| 4,283,634 A | 8/1981 | Yannone et al. | 290/40 R |
| 4,301,375 A | 11/1981 | Anderson | 290/1 R |
| 4,308,463 A | 12/1981 | Giras et al. | 290/1 |
| 4,314,441 A | 2/1982 | Yannone et al. | 60/39.28 R |
| 4,341,071 A | 7/1982 | Abo et al. | 60/39.14 R |
| 4,504,190 A | 3/1985 | Beeloo | 415/166 |
| 4,506,503 A | 3/1985 | Ogborne et al. | 60/39.281 |
| 4,537,024 A | 8/1985 | Grosjean | 60/39.161 |
| 5,185,693 A | 2/1993 | Loftis et al. | 364/187 |
| 5,237,816 A | 8/1993 | Duffy et al. | 60/39.182 |
| 5,333,458 A | 8/1994 | Loving | 60/722 |
| 5,372,005 A | 12/1994 | Lawler | 60/39.02 |
| 5,408,957 A | 4/1995 | Crowley | 123/27 GE |
| 5,419,112 A | 5/1995 | Farrell | 60/39.15 |
| 5,678,408 A | 10/1997 | Janes | 60/728 |
| 5,709,076 A | 1/1998 | Lawlor | 60/39.35 |
| 5,896,741 A | 4/1999 | Etheridge | 60/39.23 |
| 6,088,630 A | 7/2000 | Cawlfield | 700/266 |
| 6,127,758 A * | 10/2000 | Murry et al. | 310/168 |
| 6,148,617 A | 11/2000 | Williams | 60/737 |
| 6,282,882 B1 * | 9/2001 | Dudd et al. | 60/790 |
| 6,422,023 B1 * | 7/2002 | Dudd et al. | 60/773 |

* cited by examiner

Primary Examiner—William A. Cuchlinski, Jr.
Assistant Examiner—Olga Hernandez
(74) Attorney, Agent, or Firm—Standley Law Group LLP (57) ABSTRACT

A turbine overspeed control system for a gas turbine electrical powerplant. The powerplant may employ an aeroderivative gas turbine engine for producing electrical power. The overspeed control system preferably comprises a compression relief system and an air directing system. When an overspeed condition of the gas turbine engine is detected, the compression relief system acts to remove air from a combustion section of the engine. Preferably, the air is removed to the atmosphere. The air directing system operates to ensure that air entering a compressor section of the gas turbine engine does not impinge on the blades of a compressor turbine located therein at the optimum angle. The result of operating the compression relief and air directing systems is a reduced combustor efficiency. Consequently, a reduced amount of hot gases are available to drive the turbines of the gas turbine engine, and the rotational speed thereof decreases.

37 Claims, 7 Drawing Sheets

OVERSPEED CONTROL SYSTEM FOR GAS TURBINE ELECTRIC POWERPLANT

BACKGROUND AND SUMMARY OF THE INVENTION

The present invention relates to a gas turbine electric powerplant, and more particularly to a system for controlling a turbine engine used to operate the powerplant. The powerplant uses a turbine engine, such as an aircraft engine, to operate an electric generator that produces electric power. The system of the present invention ensures that the speed of the turbine engine will not exceed a safe limit should the load on the turbine engine be dropped. The system of the present invention allows the powerplant to be operated safely in an unattended condition.

There are numerous situations wherein it may be desirable to use a powerplant of the present invention. For example, it may be necessary to provide electrical power to a remote area that is not supplied by a utility company. Electric power consuming: operations that are commonly conducted in remote areas include, for example, drilling for oil and natural gas. Such operations may require more power than can be supplied by typical gas or diesel generators. When such an operation is too remote to receive power from a utility, the powerplant of the present invention may be used to supply electric power to the operation. Similarly, the powerplant of the present invention can be used when electric power production is required on only a temporary basis. For example, in the above-described remote drilling operation, utility power may be available, but the cost may be prohibitive based on the short period of time during which electric power will be required. Such a situation may also occur during large-scale, remote construction projects.

The power plant of the present invention may also be used to provide backup power during interruption of electric power supplied from a utility or other source. The powerplant of the present invention may be brought online in as little as 30–60 seconds, thereby preventing long periods of down time. Use of the powerplant for backup power may be highly effective for commercial buildings, manufacturing facilities, hospitals, or other locations wherein a long term interruption of electric power is particularly problematic.

One or more of the powerplants of the present invention may also be used in a variety of ways by a producer of electric power. For example, an electric utility may utilize one or more of the powerplants to provide load-leveling or peak shaving during periods of high demand for electric power. Utilities commonly struggle with the problem of meeting peak demand, which occurs typically at particular times of the day, and is usually more severe during certain times of the year. Peak demand is the result of consumers using more electricity at particular times of the day than at others; for example, during the waking hours as opposed to during the nighttime hours. To meet peak demand, power plants must typically be overdesigned—meaning that they only run near peak efficiency during periods of high demand. Therefore, for the majority of a given day, the power plant runs at a reduced output and, unfortunately, a lower efficiency. By employing the powerplant of the present invention, utility power generating plants could be designed to meet only average demand while running at optimum efficiency. One or more of the power plants of the present invention could then be tied to the utility's distribution grid, and when peak demands arise, the powerplants can be operated to inject additional electric power into the grid. The control system of the powerplant of the present invention can provide for automatic start-up and operation when high demand is detected. When the demand ebbs, the powerplants can be shut down as needed. The portability of the powerplant of the present invention also allows additional units to be set up at a utility if needed to meet increasing peak demand. Such a situation may occur when a particular area or areas served by a utility grows at a faster than expected rate. In this manner, both the cost of building a utility plant and the cost of producing electricity may be reduced, while still ensuring that peak demand can be met.

The powerplant of the present invention can also be used as a source of co-generation electric power. For example, the powerplant may be installed at an industrial facility and tied into the facilities electric power transmission and distribution system in order to augment the electric power supplied by an electric utility company. The cost to purchase electric power from a utility may vary throughout a given day or week. For example, it is common for large industrial facilities to limited in the amount of power they may use, or to otherwise be charged a significantly elevated price during periods of high demand. Such may occur, for example, during periods of extreme weather, when the general consumption of electric power typically increases. When such a situation exists, the industrial facility may operate one or more of the powerplants to supplement the electric power it receives from the utility. In this manner, the industrial facility can avoid having to either reduce its power consumption or pay a higher cost for electric power during such periods. The hot exhaust from the turbine engine may also be harnessed to provide heat or power to other devices.

The powerplant of the present invention can also be used as a source of distributed power generation. As certain populated areas grow, the demand for electric power generally increases. Many times, the provider of electric power does not have the capacity to meet the increased demand. For this reason, electric utilities often form cooperatives, or otherwise enter into agreements wherein electric power may be sold and delivered between the utilities. Thus, if one utility cannot meet demand, and a second utility has excess capacity, the second utility may sell blocks of power to the first utility. The first utility may be at a disadvantage, because the cost to purchase and transfer the electric power to the area of demand may be high. The second utility is able to take advantage of its excess capacity by selling and distributing the electricity to other providers. The powerplant of the present invention can be used to take advantage of growing markets, by allowing a provider to produce additional electric power that may be sold to other providers without sufficient capacity. Alternatively, the powerplant of the present invention may be used by a provider to obviate the need for purchasing additional electric power from another utility. Rather, the provider may use the powerplant to produce incremental electric power in small blocks, minimizing large incremental power block purchases from other utilities. The powerplant can be located to provide electric power wherever it is needed. For example, the powerplant may be placed at a distribution substation and tied into a utility's transmission and distribution lines.

The powerplant of the present invention uses a gas turbine engine to run an electric generator. More specifically, the powerplant uses an aeroderivative gas turbine engine, such as is designed for a helicopter. The turbine engine may be purchased new, or may be removed from an aircraft and retrofitted for use in the powerplant. Although a variety of turbine engines may be employed, preferably the turbine engine is a turboshaft engine. Gas turbine engines may produce in excess of 1,000 horsepower and significant torque. It has been found that turbo shaft engines are easier to harness than are turbo thrust engines.

A gearbox is preferably used to reduce the output speed of the turbine engine to a predetermined value. While the turbine engine may have an internal gear reduction, an external gearbox is typically required to obtain the proper input speed to a generator. It is possible to use a gearbox with either a fixed or variable speed reduction. The input of the gearbox is connected to the output shaft of the turbine engine by a specialized coupling.

The output shaft of the gearbox is connected to the input shaft of an electric power generator, such as a permanent magnet generator, by a specialized coupling. Rotation of the generator's input shaft and windings produces electric power that can be output to a specific load or into the power grid of an electric utility. The generator can be selected to provide the desired voltage and power output. For example, in one embodiment, the generator may produce approximately 1.2 MW of power at 480 volts.

As can be seen from the foregoing, the various uses for the gas turbine electric powerplant of the present invention may include the need to operate the powerplant in an unattended state. Thus, it is critical that the turbine engine be automatically shut down should it become disconnected from its load. The control system of the present invention operates to automatically shutdown the turbine engine if its speed exceeds a predetermined limit, such as due to a failure of the gearbox or generator. The main control system of the gas turbine electric powerplant is microprocessor based system that is preferably able to monitor a multitude of powerplant conditions, such as fuel flow, various temperatures, turbine speed, and many other conditions. The control system may be PC-based. The control system and its associated software provides for real time control and trend capabilities, based on the monitored conditions and on user settings. Additional, mechanical control systems are provided to ensure that the turbine engine can be slowed if a no-load situation occurs.

In conjunction with the main microprocessor-based control system and software, two particular mechanical systems are provided to control the gas turbine engine should it become disconnected from its load. These systems enable the gas turbine electric powerplant to be safely operated in an unattended condition. Because of the high rotational speed of the gas turbine engine, should the load connected thereto be suddenly removed, such as due to, for example, a broken coupling, a gearbox failure, or other causes, the rotational speed of the gas turbine engine could quickly exceed safe operating limits. Thus, a sudden and unexpected removal of the load will often cause the turbine engine to enter what is commonly referred to as an "overspeed" or "runaway" condition. If nothing is done to slow the turbine engine, the result of such a condition may be the failure of the engine and possibly other components connected thereto. More catastrophically, the high rotational speeds that may result, can cause the turbine engine to disintegrate, destroying the engine and endangering persons and other equipment in the area.

In the gas turbine electric powerplant of the present invention, should the load on the turbine engine caused by driving the gearbox and generator be suddenly dropped or significantly reduced, action must be taken very quickly to prevent the turbine engine from entering into an overspeed condition. To this end, the gas turbine electric powerplant employs both a compression relief system and an air directing system to control the speed of the turbine engine in the case that an overspeed condition is detected.

The gas turbine engine that is contemplated for use in the present invention is preferably a split shaft, or free power turbine engine—meaning that the turbine engine has separate, and mechanically independent gas producer and power turbines. The turbine engine is also of the turboshaft variety, meaning that the power turbine within the engine is coupled, either directly or through a reduction gearbox, to an output shaft. When an overspeed condition is detected by control software monitoring the gas turbine electric powerplant, the air directing system operates to slow down the turbine engine by affecting the angle at which incoming air is fed to the gas producer (compressor) turbine. In conjunction with operation of the air directing system, the compression relief system acts to slow down the turbine engine by removing incoming air needed for combustion and subsequent powering of the turbines. Consequently, even if the gas turbine electric powerplant is operated in an unattended state, safe shutdown of the turbine engine in response to an overspeed condition can be accomplished.

The gas turbine engine is designed to operate on both liquid and gaseous fuels that can provide a sufficient BTU output. Specific microprocessor-controlled fuel valves are provided based on the type of fuel that will be used to run the gas turbine engine. The fuel valves may be changed if it is desired to change the type of fuel used with the powerplant. The microprocessor-based design of each type of fuel valve allows the valve to communicate with and respond to instructions from the microprocessor-based control system.

The assembled components of the gas turbine electric powerplant preferably reside on a common base, such as on a transportable skid. The assembled components of the gas turbine electric powerplant may also be installed to a permanent structure, such as the floor of a factory. In the transportable version of the gas turbine electric powerplant, a specialized frame is mounted to the skid and designed to receive and restrain the turbine engine. The frame is designed to maintain the centerline of the turbine engine despite the thermal expansion thereof during operation. The size and weight of the gas turbine electric powerplant components and skid allow it to be transported by truck to virtually any site where electric power is needed. Therefore, the gas turbine electric powerplant of the present invention provides for a portable source of significant electrical energy production that may be utilized to meet a number of consumer needs.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
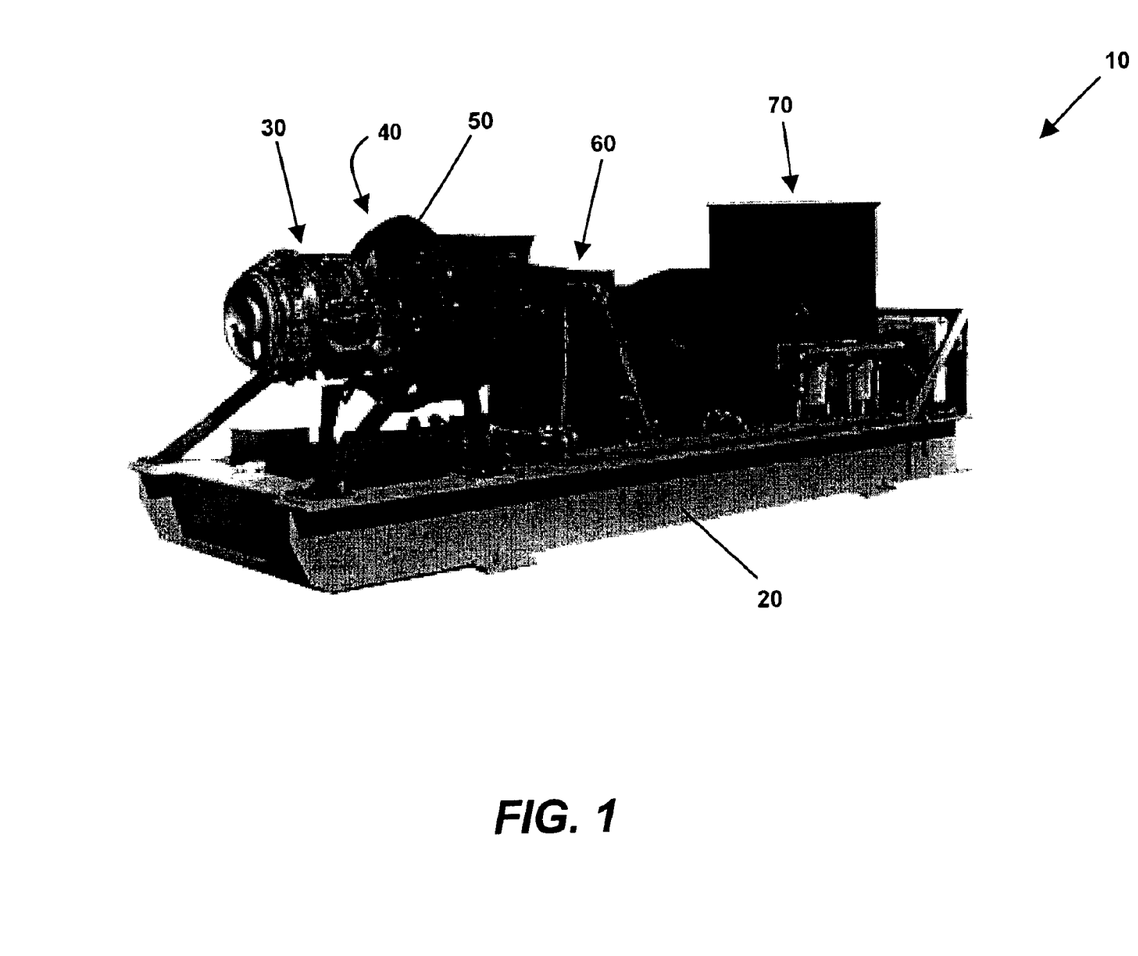
FIG. 1 is an isometric view of an exemplary embodiment of a gas turbine electric powerplant of the present invention.

An isometric view of one embodiment of a gas turbine electric powerplant 10 of the present invention can be observed in FIG. 1. The gas turbine electric powerplant 10 preferably resides on a unitary base, such as the skid 20 shown. In this manner, the entire gas turbine electric powerplant 10 can be easily and conveniently transported to virtually any location requiring electric power production. It is also possible, however, to assemble the gas turbine electric powerplant 10 onto a fixed mounting surface, such as, for example, the floor of a factory.

The gas turbine electric powerplant 10 is shown to be powered by a gas turbine engine 30, which can be better observed by reference to FIGS. 2–7. The gas turbine engine 30 may be aeroderivative, such as is intended for use in a helicopter or other aircraft. Preferably, the gas turbine engine 30 is a turboshaft engine, wherein an output shaft connected to a power turbine within the engine is provided for coupling to an external device. The use of a turboshaft-type gas turbine engine 30 is preferred over other types of turbine engine designs because the turboshaft engine exhibits less residual thrust. Various turboshaft engines may be employed to drive the gas turbine electric powerplant 10 of the present invention. For example, suitable turboshaft engines may be obtained from Avco/Lycoming, Honeywell (Allied Signal), Pratt & Whitney, Rolls Royce, Turbomecca, and other similar manufacturers. In this particular embodiment of the present invention, the gas turbine engine 30 is a T-53 series turboshaft engine manufactured by (Allied Signal) Avco/Lycoming (now Honeywell), headquartered in Phoenix, Ariz. The T-53 turboshaft engine is designed primarily for powering helicopters, and several different configurations thereof are available. In this particular embodiment, the gas turbine engine 30 can produce in excess of 1,400 shaft horsepower at output shaft rotational speeds of up to approximately 21,000 revolutions per minute. This particular gas turbine engine 30 is also of split shaft (free power) design; meaning that there is a combustion turbine connected by a first shaft to a compressor, and also a power turbine having a separate output shaft.

Because of the high rotational speeds and torque output that is generated by the gas turbine engine 30, a specialized engine mounting system 40 is used to secure the turbine engine 30 to the skid 20 or other mounting surface. The engine mounting system 40 can best be seen in FIG. 7. Rather than using a rigid mounting, the present invention utilizes a specialized engine mounting system 40, wherein the turbine engine 30 is effectively allowed to float within a solid mounting frame 50 that is securely fastened to the skid 20 or other mounting surface. The bearing mount system 40 permits thermal expansion of the turbine engine 30, while at the same time maintaining the position of the output shaft centerline. The engine mounting system 40 also assists in reducing vibrations within the gas turbine electric powerplant 10 that can result from the rotational motion of the turbine engine 30. Preferably, the engine mounting system 40 utilizes a series of mounting shafts that are secured at substantially uniformly spaced intervals around the outer circumference of the turbine engine 30. Each of the mounting shafts is received by a corresponding linear bearing located on the mounting frame 50.

An output shaft of the turbine engine 30 is coupled to the input of a speed reducing gearbox 60, to obtain a desired final output shaft speed for driving a generator 70. The final output shaft speed may vary depending on the particular generator that is driven by the turbine engine 30. In this particular embodiment of the powerplant 10, the final output shaft speed is selected to be approximately 1,800 revolutions per minute when driven at the substantially normal operating speed of the turbine engine 30. It is also possible to couple a variable speed gearbox to the output shaft of the turbine engine 30, whereby variable speed reductions thereof may be achieved.

An output shaft of the gearbox 60 is connected to the input shaft of an electric power generator 70 by a specialized coupling. Various generators may be employed by the gas turbine electric powerplant 10 to provide electric power. In the particular embodiment of the gas turbine electric powerplant 10 described herein and illustrated in the drawing figures, the generator 70 is a permanent magnet generator. The generator 70 may provide single-phase or 3-phase power at the desired output voltage. The specific operating parameters of the generator 70 can be selected based on the particular application to which the gas turbine electric powerplant 10 will be applied.

A cooling system is also preferably provided to treat various components of the gas turbine electric powerplant 10 during operation. In this embodiment, the cooling system consists of two separate, closed cooling loops, each with its own cooling fluid pumps. The pumps can operate on AC power, DC power, or both. In this particular embodiment of the gas turbine electric powerplant 10, the cooling fluid pumps operate on 24 Vdc power from an alternator. The alternator is driven by a belt that is connected to a pulley mounted to the output shaft of the speed reducing gearbox 60. One cooling loop provides cooling to the gearbox 60. The other cooling loop provides inlet pressure and the cooling necessary for continuous operation of the gas turbine engine 30. The cooling pumps preferably draw cooling fluid from a cooling fluid reservoir for circulation to the gearbox 60 or gas turbine engine 30. The cooling fluid in each cooling loop is preferably also circulated through a heat exchanger that is associated with each cooling loop. Each heat exchanger may also be provided with one or more cooling fans to provide increased cooling of the cooling fluid when necessary. Preferably, cooling system temperatures are monitored by the gas turbine electric powerplant's control system software. If the temperature of the cooling fluid exceeds a predetermined value, the control software activates one or more of the cooling fans mounted to the heat exchangers.

The gas turbine engine 30 of the gas turbine electric powerplant 10 is designed to operate effectively on a number of different fuels of both a liquid and gaseous variety. Preferably, however, the fuel is able to provide a thermal energy output of at least 600 BTU per cubic foot. Examples of acceptable liquid fuels include, among others, gasoline, diesel fuel, jet fuel, kerosene, and isopropyl alcohol. Acceptable gaseous fuels may include, among others, hydrogen, natural gas, propane, butane, and isopropane. The particular gas turbine electric powerplant 10 described in detail herein is adapted to operate on natural gas. The selected fuel is preferably supplied from a fuel source to the gas turbine engine 30 via a microprocessor-controlled fuel metering valve (not shown). When a liquid fuel is used to power the gas turbine engine 30, a liquid fuel valve is employed to meter the fuel supply. The liquid fuel valve preferably has an integrated microprocessor that allows the valve to exhibit fast response times. When a gaseous fuel is used to power the gas turbine engine 30, a gaseous fuel valve is installed on the powerplant 10. Like the liquid fuel valve, the gaseous fuel valve preferably makes use of an integrated microprocessor based electronic controller.

Based on the many uses for a gas turbine electric powerplant 10 of the present invention, it is desirous that the gas turbine electric powerplant be able to run in an unattended condition. To this end, it is necessary to ensure the automatic and safe shutdown of the gas turbine engine 30 should the turbine engine become disconnected from the load (generator and/or speed reducer). If the gas turbine engine 30 becomes disconnected from the generator 70, or the load imparted by the generator is somehow removed, and operation of the gas turbine engine is allowed to continue without intervention, the rotational speed thereof will likely increase beyond a safe limit. This condition is often referred to as an "overspeed" or "runaway" condition. An overspeed condition can lead to the failure of the gas turbine engine 30. More seriously, an overspeed condition can lead to the disintegration of the gas turbine engine 30 if the rotational speed thereof increases beyond the limits of the engine's components. Therefore, runaway of the gas turbine engine 30 must be prevented for both operational and safety reasons.

To this end, the gas turbine electric powerplant 10 of the present invention employs an overspeed control system 80 for controlling an overspeed condition and causing the safe shutdown of the gas turbine engine 30—even when an operating gas turbine electric powerplant is left unattended. More specifically, the overspeed control system 80 of the gas turbine electric powerplant 10 utilizes a combination of an overspeed air dump (compression relief) system 90, and an air directing system 150 to control the turbine engine during an overspeed (runaway) situation. Both the compression relief system 90 and the air directing system 150 are in electrical communication with the control software of gas turbine electric powerplant 10. Thus, the customized control software of the gas turbine electric powerplant 10 is used to detect an overspeed condition, and to control the gas turbine engine 30 by activating the compression relief and air directing systems 90, 150, respectively. Although the overspeed control system 80 is described in detail herein with regard to its use on the particular gas turbine engine 30 of the exemplary embodiment, it should be realized that the overspeed control system of the present invention and its method of use can also be applied with success to other types of split-shaft gas turbine engines.

The type of turbine engine contemplated for use in the gas turbine powerplant 10 is a free power turbine engine, such as the T-53 gas turbine engine 30 shown. This type of gas turbine engine 30 has a separate and mechanically independent compressor turbine 250 and power turbine 310. Exploded views of the various sections of the gas turbine engine 30 can be seen in FIGS. 2–6. In operation, air enters an inlet section 200 (FIG. 2) at a first end 210 of the gas turbine engine 30. The inlet section 200 of the gas turbine engine 30 is designed to route the incoming air to a second, compressor section 230 (FIG. 3) of the turbine engine. A pair of gearboxes (not shown) are commonly mounted to the outer housing of the inlet section 200. The gearboxes are commonly used to drive accessories associated with an aeronautical use of the gas turbine engine 30. A gearbox may be driven by each of the compressor turbine 250 and a power turbine 310.

The compressor section 230 of the gas turbine engine 30 is comprised of an external housing 240 encasing a compressor turbine 250. To the compressor turbine 250 may be attached one or more types of blade, or vanes 260, 270, to provide an axial (annular) and/or centrifugal compression of the air as it moves through the compressor section of the gas turbine engine 30. In the particular gas turbine engine 30 shown in FIGS. 1–7, the compressor section 230 creates both axial and centrifugal compression. The compressor section 230 functions to increase the pressure of the air moving therethrough in order to improve combustion conditions in the following combustion section 300, as well as to facilitate the resulting flow of hot gases from the combustion section through the turbines 250, 310. In the particular gas turbine engine 30 described herein, the compressed air next travels through a diffuser section 280 (FIG. 4), which is designed to slow and further increase the pressure of the air received from the compressor section 230, as well as to redirect the flow direction thereof. From the diffuser section, air enters the combustion section 300 of the gas turbine engine 30, where a portion thereof is removed for use in flame control and cooling, and the remaining portion is mixed with fuel and burned. The burning of the air and fuel develops hot gases, which are routed to both the gas compressor turbine 250 and the power turbine 310 to cause the high-speed rotation thereof. The hot exhaust gas may be directed by an exhaust diffuser 320, a portion of which can be seen in FIG. 6.

Based on the operation of the gas turbine engine 30, the overspeed control system 80 operates to control an overspeed condition thereof in two ways. First, the compression relief system 90 is employed to remove operating air from the gas turbine engine 30 if an overspeed condition develops. The compression relief system 90 can be best observed by reference to FIG. 7. To best effectuate air removal from the particular gas turbine engine 30 shown, compression relief outlets 100 are preferably located around the periphery of the gas turbine engine. The compression relief outlets 100 are in communication with the inlet portion of the turbine engine's combustion section 300. When using an alternative gas turbine engine, such as one of those previously mentioned, compression relief outlets may be placed in alternate locations, a different number of outlets may be employed, or the outlets may be replaced with an alternate means of effecting air removal from the engine. A specialized manifold 110 is preferably provided to communicate with each of the compression relief outlets 100 or other air removal pathways, by way of a connector 120. Each connector may be constructed of, for example, rigid or flexible tubing. In this embodiment, the manifold 110 is designed to encircle at least a portion of the gas turbine engine 30, and is disposed near the combustion section 300 to be in the vicinity of the compression relief outlets 100. When other gas turbine engines are employed with the powerplant, the manifold may be adapted to best receive air from the engine. As such, the size, shape, and location of the manifold may be altered accordingly.

Figure 7:
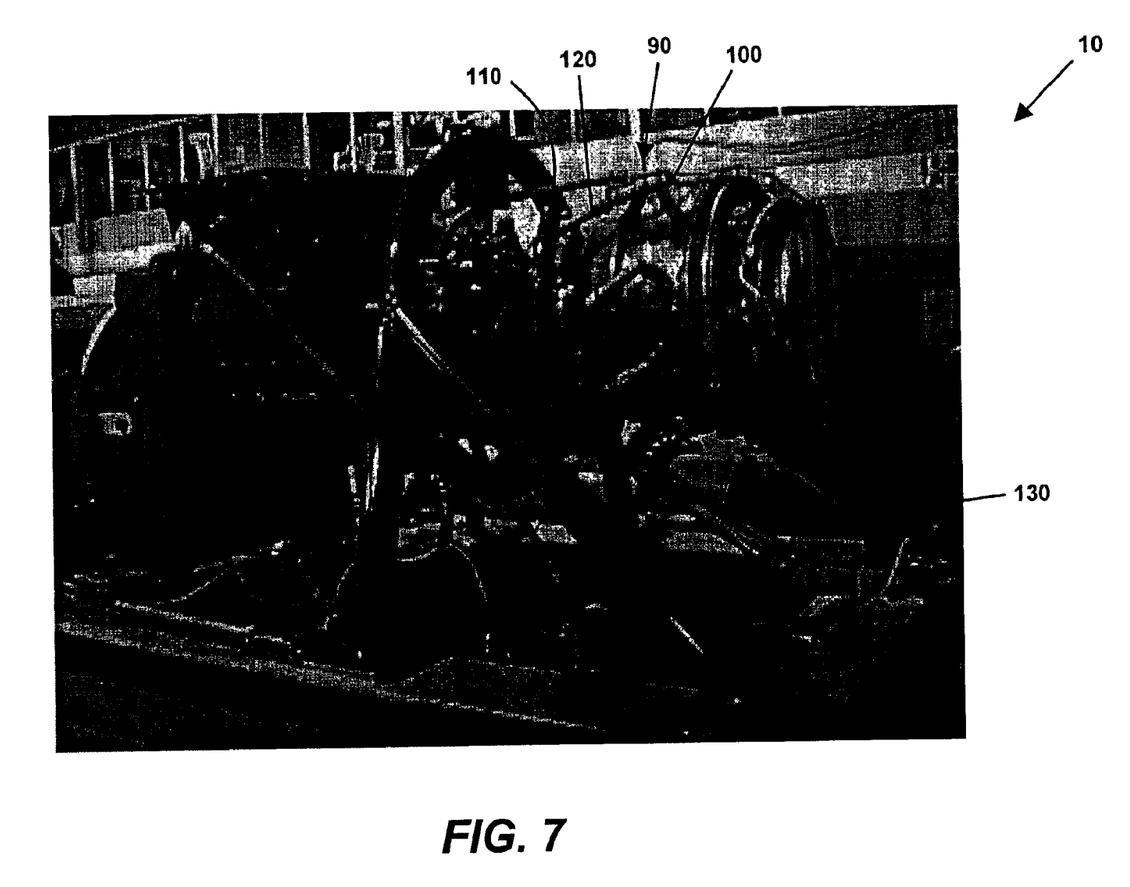
FIG. 7 is an enlarged view of the gas turbine engine of the gas turbine electric powerplant of FIG. 1, wherein a compression relief system is shown to be installed thereto.
Figure 8:
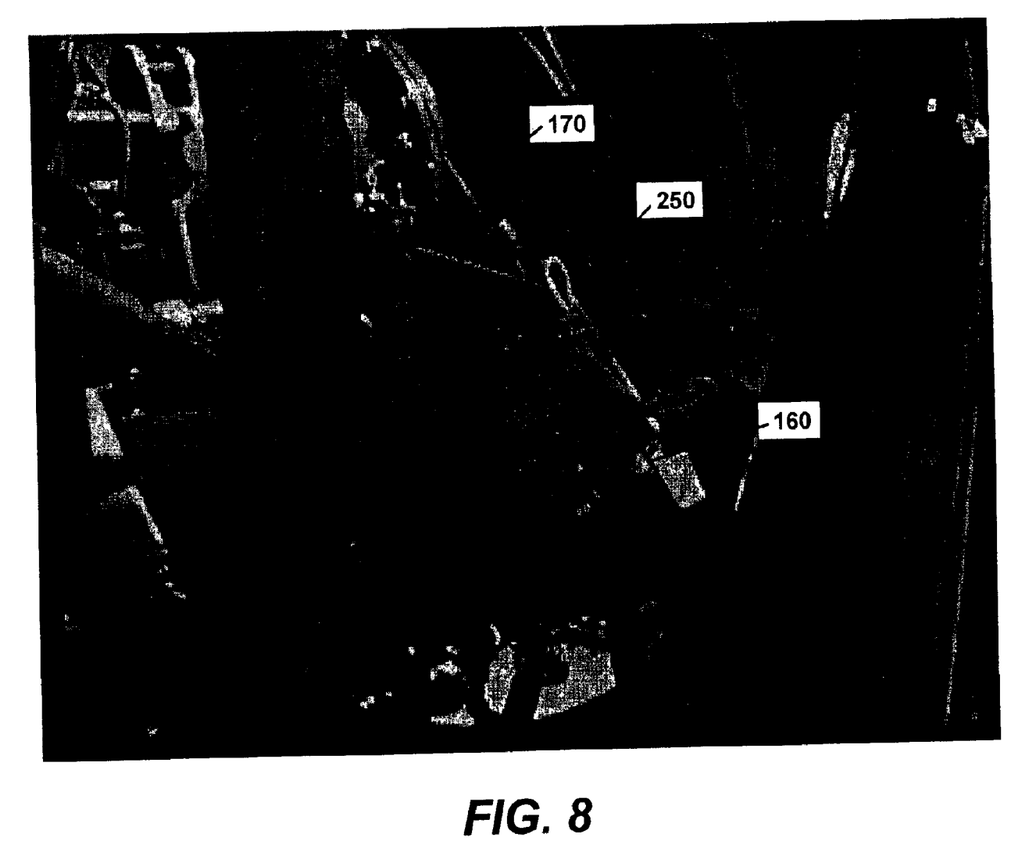
FIG. 8 is an enlarged view of a portion of the turbine engine of FIG. 1, wherein an air directing system is shown to be installed thereto.

In the case of an overspeed (runaway) condition, air moving from the compressor section 230 into the combustion section 300 of the gas turbine engine 30 is transferred therefrom to the manifold 110 through the compression relief outlets 100. The manifold 110 may be adapted to direct the air to the atmosphere or, alternatively, the air may be captured and/or used by another device. Preferably, the air is transported from the manifold 110 through one or more exhaust lines 130. In an alternate embodiment, the compression relief outlets 100 may simply be coupled to one or more exhaust lines 130 by way of extended connectors 120, thereby obviating the need for the manifold 110. In this embodiment, each of the connectors 120 may terminate at a central block, or could simply be sealed into the exhaust line 130. In either embodiment, the exhaust line(s) 130 are preferably routed through an electronic valve (not shown), such that the pathway to the atmosphere is restricted unless a runaway condition occurs. An electronic valve from the Parker Hannifin Corporation in Cleveland, Ohio may be used for this purpose, although other electronic valves may also be successfully employed. Preferably, the air is removed from the combustion section 300 of the gas turbine engine 30 prior to its mixing with fuel and subsequent burning. Thus, under the normal operating conditions of this particular embodiment of the gas turbine electric powerplant 10, activation of the compression relief system 90 will cause air to exit to the atmosphere through the electronic valve at a pressure of approximately 80 pounds per square inch, and a temperature of approximately 300 degrees Fahrenheit. Thus, when activated, the compression relief system 90 acts to draw necessary combustion air away from the combustion section 300 of the gas turbine engine 30, thereby reducing the amount of combustion that can occur. Reduced combustion results in a lesser production of hot gases and, therefore, a slowing of the compressor turbine 250 and power turbine 310 that are driven thereby.

Figure 2:
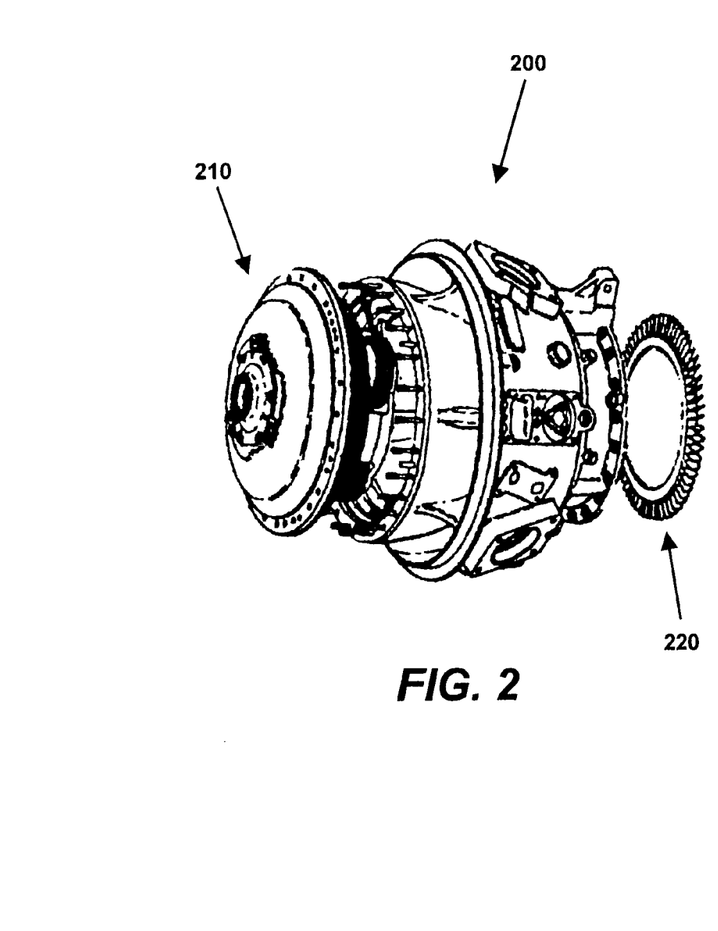
FIG. 2 is an exploded view of an air inlet section of the gas turbine engine of FIG. 1.
Figure 3:
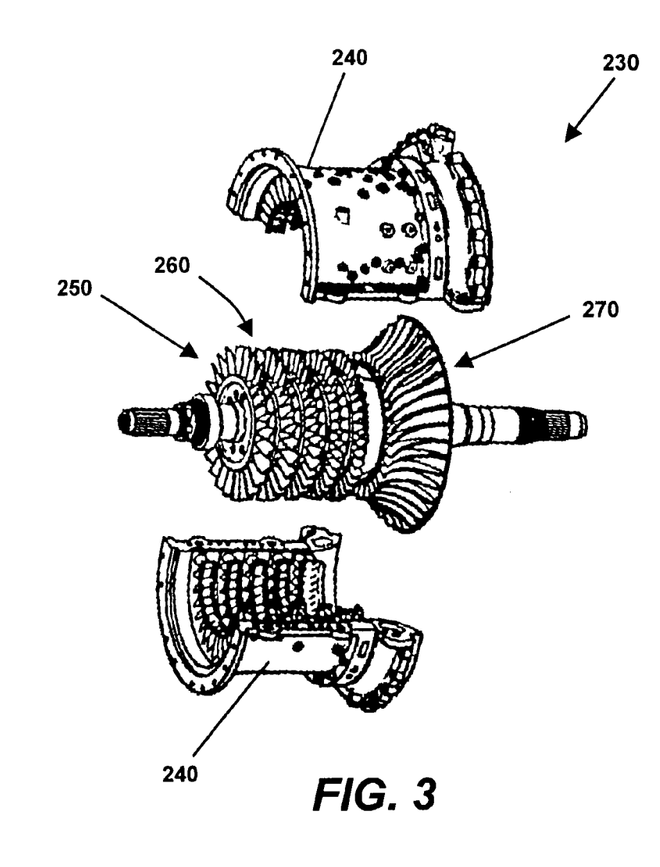
FIG. 3 is an exploded view of a gas compressor section of the gas turbine engine of FIG. 1.
Figure 4:
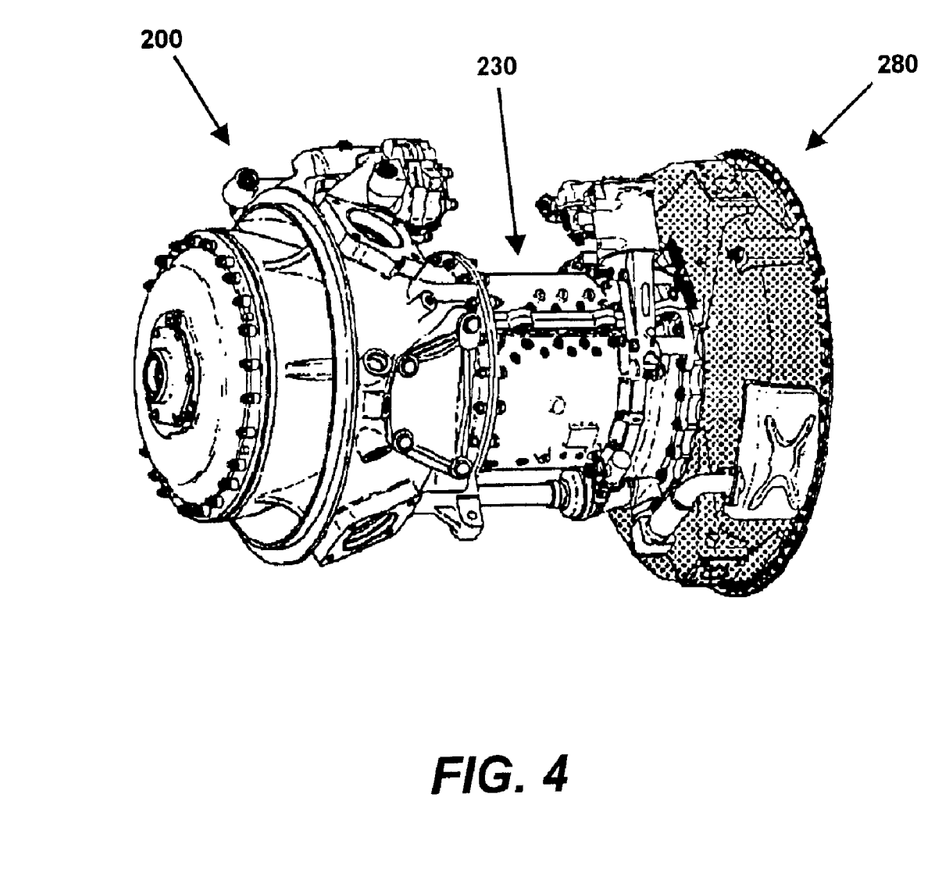
FIG. 4 shows the air inlet and gas compressor sections of FIGS. 2 and 3 assembled to a diffuser section of the gas turbine engine of FIG. 1.
Figure 5:
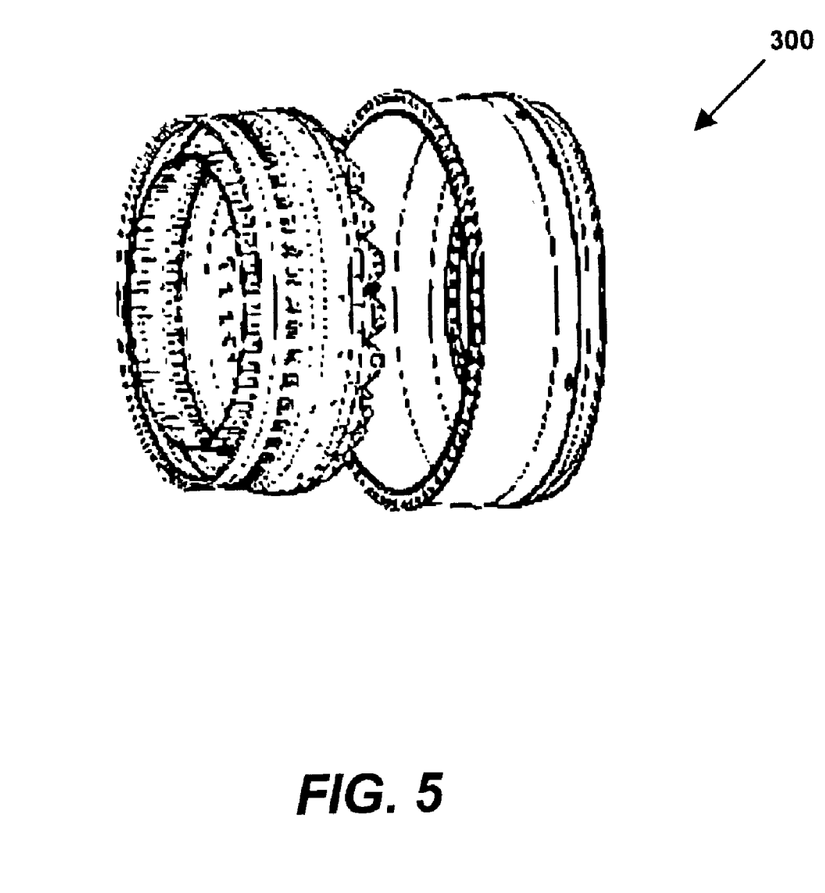
FIG. 5 is an exploded view of a combustion section of the gas turbine engine of FIG. 1, which is designed for assembly to the diffuser section of FIG. 4.
Figure 6:
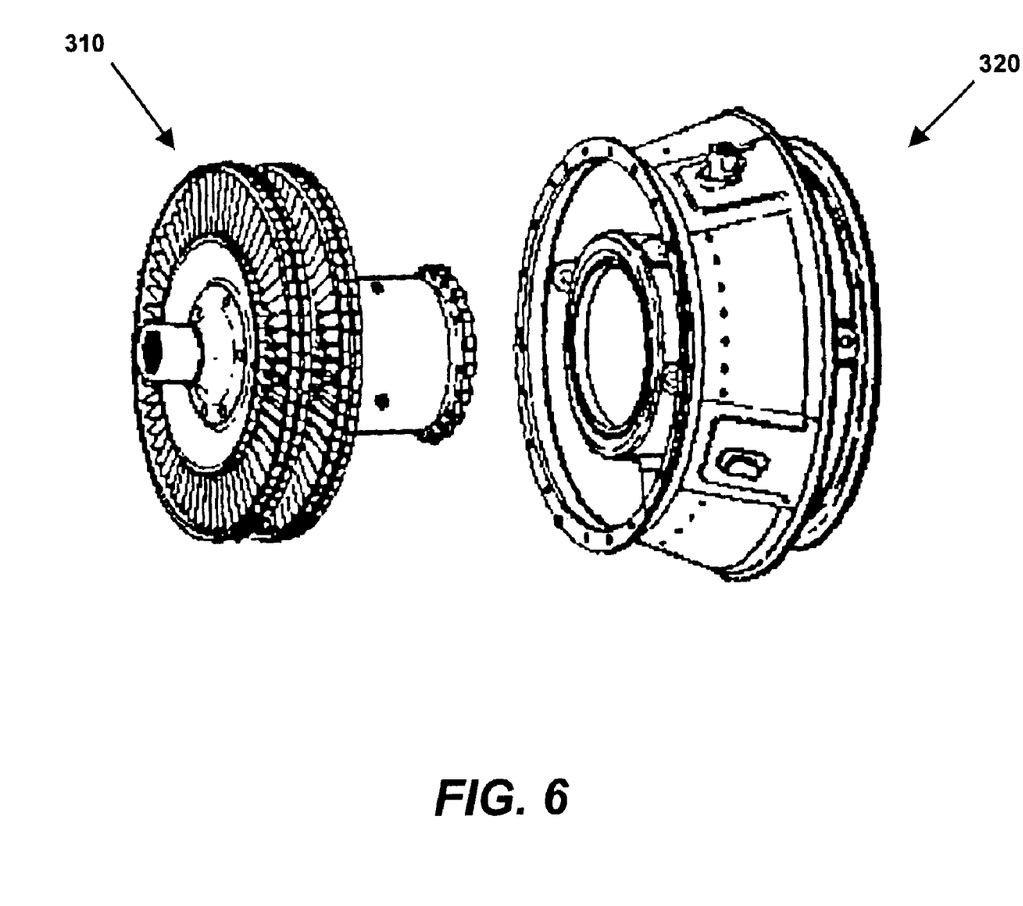
FIG. 6 is an exploded view of a portion of an exhaust diffuser designed for assembly to the combustion section of FIG. 5, wherein a power turbine of the gas turbine engine of FIG. 1 is also visible.

An air directing system 150 is also provided to work in conjunction with the compression relief system 90. The air directing system 150 is adapted to control the angle at which air entering the gas turbine engine 30 impinges the engine's compressor blades. As can be seen in FIG. 2, a set of variable inlet guide vanes 220 is located in the gas turbine engine 30, between the air inlet section 200 and the compressor section 230 thereof. The inlet guide vanes 220 are provided to straighten the air flow traveling from the air inlet section 200 into the compressor section 230, and to direct the air flow onto the blades 260 of the first stage of the compressor turbine 250 at the proper angle. The inlet guide vanes 220 are designed to automatically adjust their angle as necessary to maintain the correct path of the air flow. The air directing system 150 is provided to override the automatic adjustment function of the inlet guide vanes 220, by causing a manual adjustment to the angle thereof. Thus, the air directing system 150 is, in effect, an inlet guide vane (IGV) control system. More specifically, the air directing system 150 is preferably adapted to control the angle of the inlet guide vanes 220 in order to direct the angle at which the incoming air flow impinges the first set of the turbine engine's compressor blades 260. The air directing system 150 preferably uses an electromechanical actuator 160 to accomplish this task. However, it should be realized that another type of actuator, such as a pneumatic or hydraulic actuator may also be employed. The electromechanical actuator 160 is connected to an adjusting rod 170. The adjusting rod 170 enters the gas turbine engine 30, and is physically connected to the inlet guide vanes 220, such that the angle thereof may be manually set. Consequently, when an overspeed condition is detected by the control software, a signal is sent to the electromechanical actuator 160 that results in movement of the adjusting rod 170, and a corresponding change in the angle of the inlet guide vanes 220. The angle of the inlet guide vanes 220 is then set by the air directing system 150, such that the air entering the gas turbine engine 30 impinges the engine's compressor blades 260 at a less than optimum angle. The result of this adjustment is a reduction in compressor efficiency, which in turn results in less compressed air for supply from the compressor section 230 to the combustion section 300 of the gas turbine engine 30. Thus, the combustion process is further impeded, resulting in production of even less hot gases for powering the turbines 250, 310.

A microprocessor-based control system is used to manage the operation of the gas turbine electric powerplant 10. The control system may be PC-based. The control system receives inputs from a multitude of sensors positioned at various locations throughout the powerplant. Sensors are provided to report on, for example, turbine speed, turbine engine exhaust gas temperature, turbine engine inlet temperature, gearbox output shaft speed, generator output voltage, gearbox oil pressure and temperature, turbine engine oil temperature, bearing temperature, fuel flow rate, and inlet guide vane position. The control system preferably operates in real time. The control system of the present invention dispenses with the need to utilize relays, timers, or other control hardware. Rather, the control system software replaces the control hardware and directly reads the inputs, calculates the control actions, and writes the outputs. The operator of the powerplant preferably communicates with the control system via an operation interface. Powerplant conditions can preferably be monitored by reference to a CRT screen portion of the operation interface. The operator can preferably enter lab data, set data, set points, outputs, and controller modes, and may acknowledge alarms, and perform multiple other tasks from a keyboard or from a touch screen. Several views are preferably available that enable the operator to monitor various aspects of the powerplant.

The microprocessor-based control system also specifically operates to activate the overspeed control system when a runaway condition of the gas turbine engine 30 is detected. The compression relief system 90 and the air directing system 150 are activated by the gas turbine electric powerplant's control software, in response to a signal from one or more sensors. Sensors may monitor a variety of powerplant 10 conditions in order to detect an overspeed condition of the gas turbine engine 30. For example, sensors may be provided to monitor the rotational speed of the compressor turbine 250 and power turbine 310, the rotational speed of the gearbox 60, the rotational speed of the generator 70, and a multitude of other conditions. Certain of the sensors may be mounted to the gearboxes on the housing of the inlet section 200 of the gas turbine engine 30.

Although the present application describes with particularity an electric powerplant driven by a gas turbine engine, it should be realized that the overspeed control system of the present invention could also be used when the gas turbine engine is used to drive a device other than an electric generator. For example, the generator may be replaced with a compressor or a pump. In this manner, high-capacity, portable, compressor or pump systems may be created. Such systems may be used, for example, to drive natural gas through pipelines, or to pump liquids, such as oil or water. Such systems may be especially useful in remote locations, or at temporary sites, where assembling and installing permanent equipment is difficult or undesirable. The overspeed control system enables such a system to be safely operated for extended periods in an unattended condition.

The overspeed control system of the present invention allows the gas turbine electric powerplant to provide a safe, unattended source of electrical power that can be used in a variety of locations and situations. It is to be understood that the particular embodiment of the overspeed control system 80 described herein is provided for purposes of illustration and not limitation, and other embodiments may be possible, such as for application to different gas turbine engines. As such, the scope of the invention is not to be considered limited by the above disclosure, and modifications are possible without departing from the spirit of the invention as evidenced by the following claims.

What is claimed is:

1. A turbine engine overspeed control system for a gas turbine electric powerplant, comprising:
   a compression relief system operational to deprive air from one or more turbines located within said gas turbine engine by rapidly removing air from a combustion section of said turbine engine and directing said air out of said turbine engine through one or more compression relief outlets;
   an air directing system operational to de-optimize the angle at which air entering an inlet portion of said turbine engine impinges one or more sets of blades of a compressor turbine located therein;
   one or more sensors for determining an overspeed condition of said turbine engine; and
   control software in communication with said one or more sensors, said control software sending a signal to said compression relief system and/or said air directing system in response to an overspeed signal from said one or more sensors;
   wherein upon detection of an overspeed condition, said compression relief system, said air directing system, or the combination thereof, is activated to rapidly slow the rotational speed of said turbine engine.

2. The turbine engine overspeed control system of claim 1, further comprising a manifold for receiving said air from said combustion section of said turbine engine.

3. The turbine engine overspeed control system of claim 2, wherein said manifold is located near said combustion section of said turbine engine.

4. The turbine engine overspeed control system of claim 3, wherein at least a portion of said manifold substantially follows the outer shape of said combustion section of said turbine engine.

5. The turbine engine overspeed control system of claim 2, wherein said one or more compression relief outlets are adapted to direct said air from said combustion section of said turbine engine to said manifold.

6. The turbine engine overspeed control system of claim 5, wherein a plurality of said compression relief outlets are located about the periphery of said combustion section of said turbine engine.

7. The turbine engine overspeed control system of claim 5, further comprising a connector coupling each of said compression relief outlets to said manifiold.

8. The turbine engine overspeed control system of claim 2, further comprising at least one exhaust line connected to said manifold, said at least one exhaust line for directing said air received by said manifold away from said turbine engine.

9. The turbine engine overspeed control system of claim 8, further comprising an electronic valve connected to said at least one exhaust line, said electronic valve for blocking the pathway of said air through said exhaust line when said compression relief system is inactive.

10. The turbine engine overspeed control system of claim 1, wherein said air from said combustion section of said turbine engine is exhausted to the atmosphere.

11. The turbine engine overspeed control system of claim 1, wherein said air from said combustion section of said turbine engine is captured.

12. The turbine engine overspeed control system of claim 1, wherein said air directing system includes an actuator, adapted for activation by said control software.

13. The turbine engine overspeed control system of claim 12, wherein said actuator is an electromechanical actuator.

14. The turbine engine overspeed control system of claim 12, wherein said actuator is a pneumatic actuator.

15. The turbine engine overspeed control system of claim 12, wherein said actuator is a hydraulic actuator.

16. The turbine engine overspeed control system of claim 12, wherein a rod is connected to said actuator, said rod adapted to enter said turbine engine and to adjust the angle of a set of inlet guide vanes residing therein.

17. The turbine engine overspeed control system of claim 1, wherein a sensor is provided for monitoring and reporting the rotational speed of each turbine of said turbine engine.

18. The turbine engine overspeed control system of claim 17, wherein said sensor is located on a gearbox attached to each of said turbines.

19. The turbine engine overspeed control system of claim 1, wherein a sensor is provided to monitor the rotational speed of a gearbox attached to said turbine engine.

20. The turbine engine overspeed control system of claim 1, wherein a sensor is provided to monitor the rotational speed of a generator attached to said turbine engine.

21. The turbine engine overspeed control system of claim 1, wherein said control software activates both said compression relief system and said air directing system upon detection of a turbine engine overspeed condition.

22. A turbine engine overspeed control system for a gas turbine electric powerplant, comprising:
   (a) a compression relief system adapted to remove air from a combustion section of said gas turbine engine and to direct said air out of said turbine engine, said compression relief system further comprising:
      a plurality of compression relief outlets located around the periphery of a combustion section of said gas turbine engine;
      a manifold located in the area of said compression relief outlets, and adapted to receive air therefrom;
      a connector for providing communication between each compression relief outlet and said manifold;
      at least one exhaust line connected to said manifold, said at least one exhaust line provided to direct air received by said manifold away from said turbine engine; and
      an electronic valve for blocking the pathway of said air to said atmosphere when said compression relief system is inactive;
   (b) an air directing system for dictating the angle at which incoming air impinges on one or more sets of blades of a compressor located in said turbine engine, said air directing system further comprising;
      an actuator located in the vicinity of the entrance to a compressor section of said turbine engine; and
      a rod connected to said actuator, said rod entering said turbine engine and in communication with a set of inlet guide vanes disposed therein, such that the angle of said guide vanes may be adjusted by movement of said actuator;
   (c) one or more sensors for monitoring the speed of said turbine engine and detecting the occurrence of an overspeed condition thereof; and
   (d) control software in electronic communication with said one or more sensors, said compression relief system, and said air directing system, said control software adapted to receive an overspeed signal from said one or more sensors and to send an activation signal to each of said compression relief system and said air directing system;

wherein upon detection of an overspeed condition, said compression relief system and said air directing system operate to slow the rotational speed of said turbine engine by reducing the efficiency of the compression and combustion processes thereof.

23. The turbine engine overspeed control system of claim 22, wherein at least a portion of said manifold substantially follows the outer shape of said combustion section of said turbine engine.

24. The turbine engine overspeed control system of claim 22, wherein said air removed from said combustion section of said gas turbine engine is exhausted to the atmosphere.

25. The turbine engine overspeed control system of claim 22, wherein said air removed from said combustion section of said gas turbine engine is captured.

26. The turbine engine overspeed control system of claim 22, wherein said actuator is an electromechanical actuator.

27. The turbine engine overspeed control system of claim 22, wherein said actuator is a pneumatic actuator.

28. The turbine engine overspeed control system of claim 22, wherein said actuator is a hydraulic actuator.

29. The turbine engine overspeed control system of claim 22, wherein a sensor is provided for monitoring and reporting the rotational speed of each turbine of said turbine engine.

30. The turbine engine overspeed control system of claim 29, wherein said sensor is located on a gearbox attached to each of said turbines.

31. The turbine engine overspeed control system of claim 22, wherein a sensor is provided to monitor the rotational speed of a gearbox attached to said turbine engine.

32. The turbine engine overspeed control system of claim 22, wherein a sensor is provided to monitor the rotational speed of a generator attached to said turbine engine.

33. A method for controlling an overspeed condition of a gas turbine engine of a gas turbine electric powerplant, said method comprising:

providing a compression relief system that operates to deprive rotation imparting air from one or more turbines located within said gas turbine engine by removing air from a combustion section of said gas turbine engine and directing said air out of said gas turbine engine through one or more compression relief outlets;

providing an air directing system that operates to decrease the efficiency of a compressor turbine located within said gas turbine engine by de-optimizing the angle at which air entering an inlet portion of said gas turbine engine impinges one or more sets of blades of said compressor turbine;

providing one or more sensors to detect an overspeed condition of said gas turbine engine;

providing control software in communication with said one or more sensors, said compression relief system, and said air directing system; and in response to a turbine overspeed signal from said one or more sensors, employing said control software to activate said compression relief system and said air directing system;

whereby joint operation of said compression relief system and said air directing system results in a rapid reduction in the rotational speed of said gas turbine engine.

34. The method of claim 33, wherein air removed from said combustion section of said gas turbine engine is directed to the atmosphere.

35. The method of claim 33, wherein air removed from said combustion section of said gas turbine engine is collected in a manifold before being directed to the atmosphere.

36. The method of claim 33, wherein air removed from said combustion section of said gas turbine engine is captured.

37. The method of claim 33, wherein said air directing system operates by adjusting the angle of a set of inlet guide vanes so that incoming air impinges said compressor turbine at a less than optimum angle.

* * * * *